United States Patent
Brewster et al.

[19]

[11] Patent Number: 5,888,598
[45] Date of Patent: Mar. 30, 1999

[54] PREFORM AND BOTTLE USING PET/PEN BLENDS AND COPOLYMERS

[75] Inventors: Gary Brewster, Marietta, Ga.; Scott W. Steele, Perrysburg; Sumit Mukherjee, Waterville, both of Ohio

[73] Assignee: The Coca-Cola Company, Atlanta, Ga.

[21] Appl. No.: 681,469

[22] Filed: Jul. 23, 1996

Related U.S. Application Data

[63] Continuation-in-part of Ser. No. 423,935, filed as PCT/US96/05507, Apr. 18, 1996, abandoned.

[51] Int. Cl.$^6$ .............................. B29C 49/00; B65D 1/00
[52] U.S. Cl. ................. 428/35.7; 428/36.92; 428/220; 428/339; 428/480; 428/542.8; 428/910; 264/513; 264/532
[58] Field of Search .................................. 428/35.8, 36.6, 428/36.92, 215, 339, 480, 483, 542.8, 910, 35.7, 220; 215/1 C, 12.1; 264/500, 512, 513, 532, 531, 534, 535

[56] References Cited

U.S. PATENT DOCUMENTS

| | | | |
|---|---|---|---|
| 4,355,728 | 10/1982 | Yoshino et al. | 215/1 |
| 4,407,651 | 10/1983 | Beck et al. | 432/11 |
| 4,472,556 | 9/1984 | Lipowitz et al. | 525/106 |
| 4,540,544 | 9/1985 | Jakobsen et al. | 264/532 |
| 4,863,046 | 9/1989 | Collette et al. | 215/1 |
| 4,959,421 | 9/1990 | Hirahara et al. | 525/437 |
| 5,006,613 | 4/1991 | Sheperd et al. | 525/444 |
| 5,039,780 | 8/1991 | Hashimoto et al. | 528/194 |
| 5,085,904 | 2/1992 | Deak et al. | 428/35.7 |
| 5,102,705 | 4/1992 | Yammoto et al. | 428/36.92 |
| 5,104,706 | 4/1992 | Krishnakumar et al. | 215/1 |
| 5,115,047 | 5/1992 | Hashimoto et al. | 428/480 |
| 5,250,333 | 10/1993 | McNeely et al. | 428/35.7 |
| 5,281,387 | 1/1994 | Collette et al. | 264/521 |
| 5,303,834 | 4/1994 | Krishnakumar et al. | 215/1 |
| 5,381,910 | 1/1995 | Sugiura et al. | 215/1 C |

FOREIGN PATENT DOCUMENTS

| | | |
|---|---|---|
| 0 247 566 | 12/1987 | European Pat. Off. . |
| 0 383 324 | 8/1990 | European Pat. Off. . |
| 0 415 728 | 3/1991 | European Pat. Off. . |

OTHER PUBLICATIONS

Research Disclosure, Poly (Ethylene Naphthalenedicarboxylate . . . , No. 294, Oct. 1, 1988, pp. 714–719.
Research Disclosure, Polyesters With Good . . . , No. 283, Nov. 1987, pp. 739–741.
Database WPI, Week 9127, Derwent Publications Ltd., May 24, 1991.
Database WPI, Week 8919, Derwent Publications Ltd. Mar. 30, 1989.

*Primary Examiner*—Rena Dye
*Attorney, Agent, or Firm*—Birch, Stewart, Kolasch & Birch, LLP

[57] ABSTRACT

The present invention relates to an injection molded preform comprising an open ended mouth forming portion, an intermediate body forming portion, and a closed base forming portion, wherein said preform comprises (1) a blend of (i) PEN copolymer and (ii) PET homopolymer or PET copolymer, such that when said PET and PEN components are physically mixed into a blend, said blend has about 5–70 wt %. PEN copolymer and 30 to 95 wt % PET homopolymer of copolymer therein, (2) a PEN copolymer, or (3) PEN homopolymer, and said preform having a stretch ratio in the range of 18:1 to 25:1 in order form a bottle having a volume in the range of 250 ml to 850 ml, wherein the stretch index is below 130 cm. Alternatively, said preform has a stretch ratio in the range of 18:1 to 20:1 in order to form a bottle having a volume in the range of 250 ml to 1000 ml. The invention further relates to an injection mold defining a cavity corresponding to an injection molded preform of the invention. In addition, the invention relates to a blow-molded container produced from the injection molded plastic preform described above.

32 Claims, 6 Drawing Sheets

— 5,888,598 —

PREFORM AND BOTTLE USING PET/PEN BLENDS AND COPOLYMERS

CROSS-REFERENCE TO RELATED APPLICATIONS

This application is a continuation-in-part application of U.S. Ser. No. 08/423,935 filed on Apr. 18, 1995, now abandoned, and International PCT Application No. PCT/US96/05507 filed Apr. 18, 1996 which designated the United States, the entire contents of both applications are hereby incorporated by reference.

BACKGROUND OF THE INVENTION

This invention relates to new and useful improvements in manufacturing preforms for containers, such as plastic bottles, and to preforms and containers per se. More particularly, the invention relates to a preform used to produce a plastic bottle which is recyclable, but preferably non-refillable.

A conventional PET (polyethylene terephthalate) preform (e.g. 12 ounces) is injection molded from PET homopolymer or PET copolymer such that the resulting preform has a center sidewall thickness in the range of 3 to 4 mm and a thickness in the base forming portion in the range of 3 to 4 mm. The length of such a conventional PET preform for a 12 ounce bottle is in the range of 90 to 95 mm, and the injection molded preform has a stretch ratio in the range of at least 9:1, and preferably 9:1 to 12:1.

Conventional containers made of PET resins are often deficient in that such materials may have both insufficient barrier properties and insufficient thermal stability. Reduced barrier properties of a container may adversely affect shelf life of a product provided within the container. In order to improve the barrier properties of a container, multilayer coatings are often provided within the container.

Accordingly, there is a need in the art for containers having improved barrier properties in order to provide for longer shelf life of the product within the container.

U.S. Pat. No. 5,102,705 to Yammoto et al. discloses a bottle made of polyethylene naphthalate resin and formed by stretching a preform so that the stretch index defined as follows is 130 cm or more:

$$\frac{\text{Stretch}}{\text{index}} = \frac{\text{Internal volume of stretched bottle (excluding neck portion)}}{\text{Internal volume of preform before stretching (excluding neck portion)}} \times \frac{1}{f}$$

$$f = \frac{\text{Internal surface area of stretched bottle (excluding neck portion)}}{\text{Internal volume of stretched bottle (excluding neck portion)}} \quad (\text{cm}^{-1})$$

In contrast to the express teachings of the Yammoto et al. patent, the present invention operates only in the region corresponding to a stretch index of below 130 cm. Thus, the present invention does not have a stretch index of 130 cm or above.

SUMMARY OF THE INVENTION

Therefore, a primary object of the present invention is to obtain an injection molded preform capable of providing a blow-molded, non-refillable, recyclable container having improved barrier properties and without the need for additional protective layers in the container. However, the invention is not limited to non-refillable containers.

Another object of the invention is to provide a preform which does not require retooling of the container manufacturing process, except for the preform mold design per se. Thus, the preform of the invention and the resulting container are basically obtained from existing processing equipment.

The objects of the invention are fulfilled by the first embodiment of the invention which provides an injection molded preform comprising an open ended mouth forming portion, an intermediate body forming portion, and a closed base forming portion, wherein the preform is comprised of a blend of (i) about 5 to 99.9 wt % (preferably about 5 to 70 wt %) PEN copolymer, (i.e. containing 90–95 mol % NDC and 5–10 mol % terephthalate or other diacid), and (ii) 0.1 to 95 wt % (preferably 30 to 95 wt %) PET homopolymer or PET copolymer, based on the total weight of the preform, such that when said PET and PEN components are physically mixed into a blend, said blend has about 5–99.9 wt % PEN copolymer therein and 0.1 to 95 wt % PET homopolymer or copolymer therein, and the preform has a stretch ratio in the range of 18:1 to 25:1 in order to form a bottle having a volume in the range of 250 ml to 850 ml, wherein the stretch index is below 130 cm, preferably below 125 cm, more preferably below 100. Moreover, the injection molded preform preferably has a maximum wall thickness of about 8 mm and a minimum wall thickness of about 2 mm. The average wall thickness of the resulting bottle may be in the range of 0.25 to 0.65 mm.

A second embodiment of the invention is identical to the above-mentioned first embodiment, except said preform has a stretch ratio in the range of 18:1 to 20:1 in order to form a bottle having a volume in the range of 250 ml to 1000 ml, wherein the stretch index is below 130 cm.

The objects of the invention are also fulfilled by providing an injection molded preform comprising an open ended mouth forming portion, an intermediate body forming portion, and a closed base forming portion, wherein said preform is comprised of a PEN copolymer or 100 wt % PEN homopolymer based on the total weight of the preform, and said preform has a stretch ratio of 18:1 to 25:1 in order form a bottle having a volume in the range of 250 ml to 850 ml, wherein the stretch index is below 130 cm. In order to form a bottle having a volume in the range of 250 ml to 1000 ml, said preform has a stretch ratio of 18:1 to 20:1, wherein the stretch index is below 130 cm.

Accordingly, the composition of the preform may be any one of (i) a physical blend of suitable resins having about 5–99.9 wt % (preferably 5–70 wt %) PEN copolymer therein and having improved barrier properties over existing PET formulations (i.e. no need for multilayers), (ii) 100 wt % PEN homopolymer, or (iii) a PEN copolymer, and which provides a stretch ratio of 18:1 to 25:1 (or 18:1 to 20:1 depending on the desired volume of the bottle), wherein the stretch index is below 130 cm.

The injection molded preform of the invention ranges in size from (i) a first preform having a thickness in the range of about 3 mm at the center side wall forming portion, a thickness of about 3 mm in the base forming portion, and a length of about 40 mm, to (ii) a second preform having a thickness in the range of about 8.0 mm (preferably 6 mm) at the center side wall forming portion, a thickness of about 8.0 mm in the base forming portion, and a length of about 100 mm. This brackets containers approximately in the range of 250 ml to 850 ml. To bracket an upper limit of 250 ml to 1000 ml would be the same, except that the length of the second preform would be about 110 mm. Larger or smaller preforms may fall within the scope of the invention so long as the preform retains a stretch ratio of 18:1 to 25:1 (i.e. for containers from 250 ml to 850 ml), or alternatively 18:1 to 20:1 (i.e. for containers from 250 ml to 1000 ml).

Accordingly, the injection molded preform of the invention has a stretch ratio in the range of about 18:1 to about 25:1 in order to obtain containers (i.e. bottles) in the range of 250 ml to 850 ml. In order to obtain containers (i.e. bottles) in the range of 250 ml to 1000 ml, the stretch ratio is in the range of 18:1 to 20:1.

In addition, because the preform of the invention comprises (1) a blend of (i) about 5 to 99.9 wt % PEN copolymer and (ii) 0.1 to 95 wt % PET homopolymer or PET copolymer, based on the total weight of the preform, such that when said PET and PEN components are physically mixed into a blend, said blend has about 5–99.9 wt % PEN copolymer therein and 0.1 to 95 wt % PET homopolymer or copolymer therein, (2) a 0.5 to 99.9 mol %, preferably 0.5 to 30 mol % or 80 to 99.9 mol % NDC containing PEN copolymer, for example, containing 0.5 to 50 mol % NDC and 50 to 99.5 mol % of a diacid (i.e. terephthalic acid), or is comprised of (3) 100 wt % PEN homopolymer, based on the total weight of the preform, there is no need for the use of multilayer coatings to provide the improved barrier properties. Thus, the injection molded preform of the invention is preferably not of a laminated construction.

The invention is further directed to a container produced from any of the preforms of the invention. The container, for the most part, is highly biaxially oriented, but has a non-oriented neck finish for receiving a closure. Such a container is capable of receiving a hot fill product with a minimum of shrinkage and distortion.

Finally, the invention is directed to a mold for forming the preform of the invention as well as to a method for producing the containers from the preform of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects of the present invention and the advantages thereof will become more readily apparent by reference to the following drawings.

DETAILED DESCRIPTION OF PREFERRED EMBODIMENTS

Figure 1:
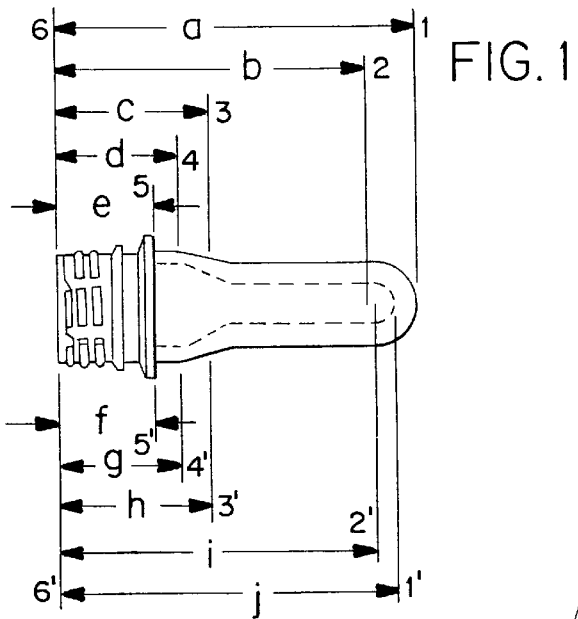
FIGS. 1 and 2 are injection mold preforms of the invention.

The phrase "stretch ratio" as used herein refers to nomenclature that is customary and known in the art, as modified below. That is, the inventors intend that the conventionally known term "stretch ratio" is more specifically defined as follows:

$$\text{Stretch Ratio} = \frac{\text{Maximum Bottle diameter}}{\text{Internal Preform Diameter}} \times \frac{\text{Height of Bottle (without finish)}}{\text{Height of Preform (without finish)}}$$

Therefore, whenever the inventors refer to the term "stretch ratio" in the present application, they are more specifically referring to the "stretch ratio" as defined above.

The present invention relates to the manufacture of preforms for containers, such as bottles, and to the preforms and containers per se. The injection molded preform comprises an open ended mouth forming portion, an intermediate body forming portion, and a closed base forming portion. The preform comprises a blend of (i) about 5 to 99.9 wt % (preferably about 5 to 70 wt %) PEN copolymer, (i.e. containing 90–95 mol % NDC and 5–10 mol % terephthalate or other diacid), and (ii) 0.1 to 95 wt % PET homopolymer or PET copolymer, based on the total weight of the preform, such that when said PET and PEN components are physically mixed into a blend, said blend has about 5 to 99 wt % (preferably 5 to 70 wt %) PEN copolymer therein, and 0.13 to 95 wt % (preferably 30 to 95 wt %) PET homopolymer or copolymer therein. The preform has a stretch ratio in the range of about 18:1 to about 25:1 in order to obtain containers (i.e. bottles) in the range of 250 ml to 850 ml. In order to obtain containers (i.e. bottles) in the range of 250 ml to 1000 ml, the stretch ratio is in the range of 18:1 to 20:1. The injection molded preform of the invention may also be comprised of a 0.5 to 99 mol %, preferably 0.5 to 30 mol % or 80 to 99.9 mol % NDC containing PEN copolymer, for example, containing 0.5 to 50 mol % NDC and 50 to 99.5 mol % of a diacid (i.e. terephthalic acid), or 100 wt % PEN homopolymer based on the total weight of the preform, so long as the preform has a stretch ratio of 18:1 to 25:1 (preferably 23.6:1 for a 12 ounce bottle) for containers in the range of 250 ml–850 ml and 18:1 to 20:1 for containers in the range of 250 ml and 1000 ml.

In all embodiments of the present invention, the stretch index is below 130 cm, preferably below 125 cm, and more preferably below 100 cm.

Figure 2:
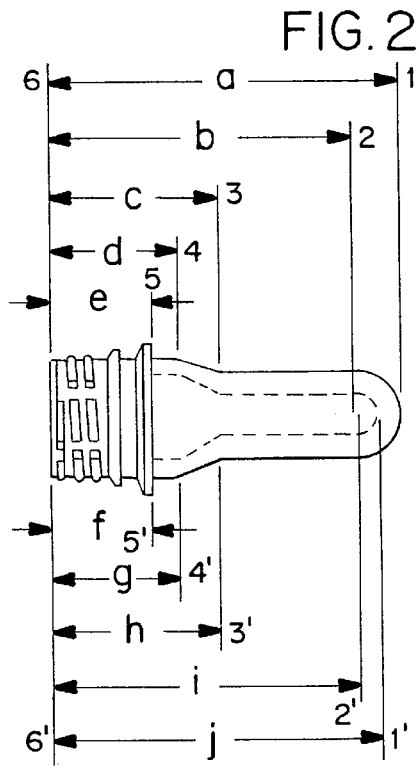

The invention is based upon a preform mold design which maintains the stretch ratio at least about 18:1 (FIGS. 1–2). The invention incorporates designs ranging from 14 to 23% shorter in length than conventional preform designs with a sidewall thickness 39 to 52% greater than conventional designs, with 39 to 58% greater thickness in the base forming region than conventional designs.

TABLE 1

Illustrative Dimensions of Preforms in FIG. 1

| Reference No. | Thickness, mm. |
| --- | --- |
| 2-2' | 0.768 (outside Ø) |
| 2-2' | 0.341 (inside Ø) |
| 3-3' | 0.779 (outside Ø) |
| 3-3' | 0.352 (inside Ø) |
| 4-4' | 1.010 (outside Ø) |
| 4-4' | 0.854 (inside Ø) |
| 5-5' | 1.010 (outside Ø) |
| 5-5' | 0.854 (inside Ø) |

TABLE 2

Illustrative Dimensions of Preforms in FIG. 2

| Reference No. | Thickness, mm. |
| --- | --- |
| 2-2' | 0.713 (outside Ø) |
| 2-2' | 0.316 (inside Ø) |
| 3-3' | 0.736 (outside Ø) |
| 3-3' | 0.338 (inside Ø) |
| 4-4' | 1.010 (outside Ø) |
| 4-4' | 0.854 (inside Ø) |
| 5-5' | 1.010 (outside Ø) |
| 5-5' | 0.854 (inside Ø) |

TABLE 3

Dimensions of Preform - FIG. 1

| Reference Letter in FIG. 1 | Dimensions in Millimeters (mm) |
| --- | --- |
| a | 3.125 REF. |
| b | 2.741 CEN. |
| c | 1.450 |
| d | 1.027 |
| e | 0.827 |
| f | 0.831 |
| g | 1.085 |
| h | 1.457 |
| i | 2.795 CEN. |
| j | 2.966 REF. |

TABLE 4

Dimensions of Preform - FIG. 2

| Reference Letter in FIG. 2 | Dimensions in Millimeters (mm) |
| --- | --- |
| a | 2.864 REF. |
| b | 2.507 CEN. |
| c | 1.438 |
| d | 1.066 |
| e | 0.827 |
| f | 0.831 |
| g | 1.071 |
| h | 1.445 |
| i | 2.559 CEN. |
| j | 2.716 REF. |

In further illustration of preferred embodiments of the present invention, as seen in FIGS. 1 and 2, the dimensions of the preforms shown thereby are as follows.

In FIG. 1, a reference dimension (a) of 3.125 mm defines the overall length of the preform from the top of the neck or threaded collar to the exterior of the bottom, which curves with a radius of 0.384 mm on the exterior wall and a radius of 0.171 mm on the interior wall. The reference dimension (j) from the center of the bottom of the interior wall to the top of the exterior of the neck is 2.966 mm, and the distance from the top exterior to the beginning of the outside curve at the lower portion along the central axis or line is 2.795 mm (i). The distance along the center line or axis (1-1') from the corresponding point in the curve at the upper portion to the top of the neck is 2.741 mm (b). In the preform of FIG. 1 the exterior radius between the reference lines 3-3' and 4-4' is 0.394 mm, while the interior radius between lines 3-3' and 4-4' is also 0.394 mm, the distance from the reference line 3-3' to the reference line 6-6' ranges from 1.450 mm (c) to 1.457 mm (h), and the distance from the reference line 4-4' to the reference line 6-6' ranges from 1.027 mm (d) to 1.085 mm (g), while the distance from the reference line 5-5' to the reference line 6-6' is in the range of 0.827 mm (e) to 0.831 mm (f).

Turning now to the support ledge shown in FIG. 1 along the reference line 5-5', the reference line 0.827 mm (e) is shown from the lower edge of the support ledge to the reference line 6-6'. The exterior radius of the lower edge of the support ledge is 0.016 mm, while the exterior radius of the ledge is 0.025 mm and the inner diameter of the support ledge outer wall is 1.248 mm, while the inner diameter of the wall along the reference line 4-4' is 1.010 mm. The radius of the lower edge of the support ledge is 0.038 mm. The angle between the reference line 5-5' and the upper edge of the support ledge is 16.5°. The radius of the outer upper edge of the support ledge is 0.25 mm, while the outer wall of the threaded neck where it joins the upper edge of the support ledge has a radius of 0.060 mm. The thickness of the support ledge at the outer wall is 0.057 mm. The entire weight of the preform is 21.0 g (Husky).

Turning now to FIG. 2, the preform which is shown therein is 17.9 g in weight and is manufactured by the Husky Company.

In FIG. 2, the reference line defining the overall dimension is 2.864 mm (a). The outside bottom wall curves with a radius of 0.357 mm, whereas the interior wall curves with a radius of 0.157 mm. The reference dimension from the interior bottom wall center to the top of the neck (line 6-6') is 2.716 mm (j). The radius of the outside wall along the reference line 3-3' is 0.394 mm and the radius 0.394 mm along the line 3-3' on the interior wall of the preform is FIG. 2. Along the reference line 4-4' the radius of the exterior wall of the preform of FIG. 2 is 0.197 mm, while the radius of the interior wall along the reference line 4-4' is 0.197 mm.

Other dimensions of the preform of FIG. 2 are set out in the Tables 2 and 4 hereinabove.

Generally speaking, the preform ranges in size from (i) a first preform (i.e. 250 ml) having a thickness in the range of about 3 mm at the center side wall forming portion, a thickness of about 3 mm in the base forming portion, and a length of about 40 mm, to (ii) a second preform (i.e. 850 ml) having a thickness in the range of about 8.0 mm, preferably 6 mm, at the center side wall forming portion, a thickness of about 8.0 mm, preferably 6 mm, in the base forming portion, and a length of about 100 mm. Larger or smaller preforms may fall within the scope of the invention so long as the preform retains a stretch ratio of about 18:1 to about 25:1 and the stretch index is below 130 cm. A preform for forming a container of up to 1000 ml may be used, but such preform would have a stretch ratio of about 18:1 to about 20:1, a stretch index below 130 cm and it would have a thickness in the range of about 8.0 mm, preferably 6 mm, at the center side wall forming portion, a thickness of about 8.0 mm, preferably 6 mm, in the base forming portion, and a length of about 110 mm. The preform of the invention is preferably not of a laminated construction.

TABLE 5

Figure 12:
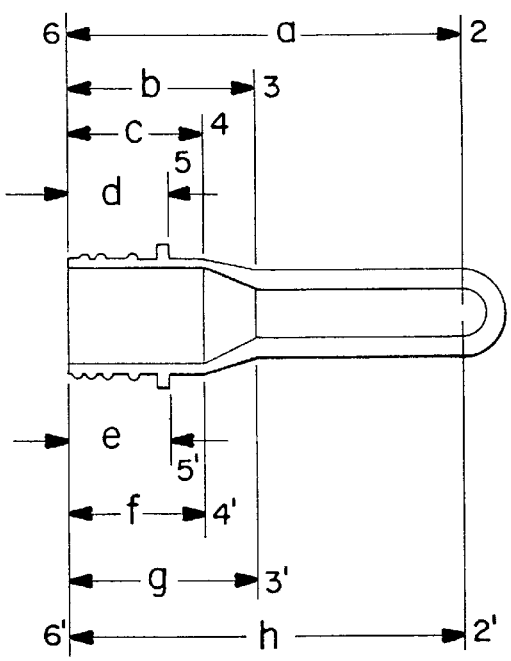
FIG. 12 shows a preform of the prior art.

Dimensions of Preform - FIG. 12

| Reference Letter in FIG. 12 | Dimensions in Millimeters (mm) |
|---|---|
| a | 3.300 |
| b | 1.594 |
| c | 1.100 |
| d | 1.831 |
| e | 0.883 |
| f | 1.150 |
| g | 1.544 |
| h | 3.310 |

TABLE 6

Figure 13:
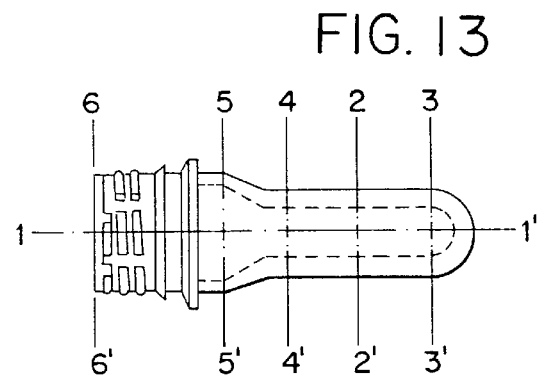
FIG. 13 shows a generic preform of the invention.

Illustrative Dimensions of Preforms Having Overall Length 40–100 mm - FIG. 13

| Reference No. | Thickness, mm. |
|---|---|
| 1-1' | 3–8.0 |
| 2-2' | 3–8.0 |
| 3-3' | 3–8.0 |
| 4-4' | 3–8.0 |
| 5-5' | 1.7–6.5 |

Generally speaking, the preform ranges in size from (i) a first preform (i.e. 250 ml) having a thickness in the range of about 3 mm at the center side wall forming portion, a thickness of about 3 mm in the base forming portion, and a length of about 40 mm, to (ii) a second preform (i.e. 850 ml) having a thickness in the range of about 8.0 mm, preferably 6 mm, at the center side wall forming portion, a thickness of about 8.0 mm, preferably 6 mm, in the base forming portion, and a length of about 100 mm. Larger or smaller preforms may fall within the scope of the invention so long as the preform retains a stretch ratio of about 18:1 to about 25:1 and the stretch index is below 130 cm. A preform for forming a container of up to 1000 ml may used, but such preform would have a stretch ratio of about 18:1 to about 20:1 a stretch index below 130 cm and it would have a thickness in the range of about 8.0 mm, preferably 6 mm, at the center side wall forming portion, a thickness of about 8.0 mm, preferably 6 mm, in the base forming portion, and a length of about 110 mm. The preform of the invention is preferably not of a laminated construction.

The preforms and containers are produced from physical PET/PEN resin blends, PEN copolymers, or PEN homopolymers, as discussed below.

Methods for making the PET homopolymers, PET copolymers as well as the PEN homopolymers and PET copolymers per se are known in the art.

Physical Blends

Physical mixtures contain (i) a PET homopolymer or PET copolymer and (ii) a PEN copolymer. The PEN copolymer of the blend is at least 0.5 mol % to 99.9 mol % 2,6-naphthalene-dicarboxylate, (NDC, Amoco Chemical Company), and 0.1 to 99.5 mol % of another diacid component (i.e. terephthalic acid), most preferably 92 to 99.9 mol % 2,6-naphthalene-dicarboxylate and 0.1–8 mol % of another diacid component (i.e. terephthalic acid), such that when said PET and PEN components are physically mixed into a blend, said blend has about 5 to 99.9 wt % (preferably 5–70 wt %) PEN copolymer therein and 0.1 to 95 wt % (preferably 30 to 95 wt %) PET homopolymer or copolymer therein.

In one embodiment of the invention, the injection molded preform is injection molded from a physical mixture of (i) a first component of a PEN copolymer, and (ii) a second component of PET homopolymer or PET copolymer, such that when said first and second components are physically mixed into a blend, said blend contains about 5 wt % to 50 wt % PEN copolymer and 50 to 95 wt % PET homopolymer or PET copolymer based on the total weight of the preform.

In order to obtain the PEN copolymer, the pellet size of the PET copolymer or homopolymer (i.e. 0.8 to 0.84 intrinsic viscosity) is matched with the pellet size of the PEN homopolymer so that the pellets of each component are of similar size. This matching of pellet sizes avoids an undesirable sifting effect (i.e. physical separation of PEN and PET pellets). However, the size of the matched pellets per se is not important to the operation of the invention. Thus, a blend is a physical mixture of the PET and PEN components, which are mixed in any arbitrary ratio so long as the final blend is 5 to 99.9 wt %, preferably 5 to 70 wt % PEN copolymer, more preferably 5 to 50 wt % PEN copolymer, and even more preferably 15 to 35 wt % PEN copolymer.

In the injection molded preform according of the invention, said preform is injection molded from a physical mixture of (i) 5 to 76 wt %, preferably 5 to 54 wt %, more preferably 16 to 38 wt % of a first component of a PEN copolymer based on the total weight of the preform, and (ii) 24 to 95 wt %, preferably 46 to 95 wt %, more preferably 62 to 84 wt % of a second component of PET homopolymer or PET copolymer based on the total weight of the preform, such that when said first and second components are physically mixed into a blend, said blend contains about 5 wt % to 50 wt % PEN copolymer and 50 to 95 wt % PET homopolymer or PET copolymer based on the total weight of the preform.

In the injection molded preform of the invention, examples of a PEN copolymer, homopolymer and/or terpolymer include Hoechst Celanese T94, Teijin TN8756T, Teijin TC4 homopolymer, Teijin TC6, and examples of a PET copolymer include Shell 8006, 8406 Eastman 9921, Hoechst, T-80, and ICI 5827.

The first component of the blend may include up to 76 wt % PEN copolymer based on the total weight of the preform.

The second component of the blend may include up to 95 wt % PET homopolymer or PET copolymer based on the total weight of the preform.

In another embodiment of the invention, the preform is injection molded from a physical mixture of (i) 5 to 76 wt %, preferably 5 to 54 wt %, more preferably 16 to 38 wt %, of a first component of a PEN copolymer based on the weight of the preform, said PEN copolymer comprising about 5 to 8 mol % PET, and 92 to 95 mol % PEN, and (ii) 24 to 95 wt %, preferably 46 to 95 wt %, more preferably 62 to 84 wt % of a second component of PET homopolymer or PET copolymer, such that when said first and second components are physically mixed into a blend, said blend has about 5 to 50 wt % PEN copolymer and 50 to 95 wt % PET homopolymer or copolymer based on the weight of the preform, said blend being injection molded such that the preform has a thickness in the range of 3 to 8 mm at the center side wall forming portion and a thickness in the range of 3 to 8 mm in the base forming portion, the length of the preform being in the range of 73 to 110 mm.

Pen Homopolymer

The injection molded preform of the invention may also be comprised of 100 wt % PEN homopolymer based on the total weight of the preform, so long as the preform maintains a stretch ratio in the range of about 18:1 to about 25:1 in order to obtain containers (i.e. bottles) in the range of 250 ml to 850 ml, or in the range of 18:1 to 20:1 in order to obtain containers in the range of 250 ml to 1000 ml. A PEN homopolymer of the invention is not a blend of PEN homopolymer and PET.

Pen Copolymer

A PEN copolymer of the invention is distinguished from a physical blend referred to above. A PEN copolymer is basically formed from a reaction of NDC (Amoco Chemical Company) with another diacid component and ethylene glycol or other dihydroxy compounds to form a resin (e.g. U.S. Pat. No. 5,039,780). For instance, 5 to 99.9 mol % NDC is reacted with a total of 0.1 to 99.5 mol % of terephthalic acid and/or other diacids and a total equimolar amount of ethylene glycol and/or other dihydroxy compounds to form a PEN copolymer. An example of a PEN copolymer contains 92 mol % NDC and 8 mol % terephthalic polymerized with ethylene glycol.

In one embodiment of the invention, the injection molded preform comprises 0.5 to 99.9 mol % NDC, more preferably 0.5 to 50 mol % NDC containing PEN copolymer.

The acid component of the PEN copolymer may contain one or more of the following including terephthalic acid, isophthalic acid (IPA), diphenylether 4,4'-dicarboxylic acid, naphthalene-1,4-dicarboxylic acid, adipic acid, sebasic acid, decane 1,10-dicarboxylic acid, and hexahydroterephthalic acid. Examples of the residual glycol component are propylene glycol, 1,4-butane diol, neopentyl glycol, diethylene glycol, 2,2-bis(4-hydroxyphenyl)-propane, 2,2-bis(4-hydroxyethoxyphenyl)propane, and cyclohexane dimethanol (CHDM).

A PEN copolymer when injection molded in accordance with the preform dimensions of the invention is within the scope of the invention if the injection molded preform of the invention has a stretch ratio in the range of about 18:1 to about 25:1 in order to obtain containers (i.e. bottles) in the range of 250 ml to 850 ml, or a stretch ratio is in the range of 18:1 to 20:1 in order to obtain containers (i.e. bottles) in the range of 250 ml to 1000 ml. Examples of a PEN copolymer are Hoechst T91, Shell VFR 40019, and Teijin TC 6.

In one embodiment of the invention, the preform is comprised of a PEN copolymer containing about 5 to 50 mol % NDC and about 50 to 95 mol % of terephthalic acid and/or other diacids.

In another embodiment of the invention, the preform is comprised of a PEN copolymer containing about 15 mol % to 35 mol % NDC and about 65 to 85 mol % terephthalic acid and/or other diacids.

In another embodiment of the invention, the preform is comprised of a PEN copolymer containing about 5 mol % to 20 mol % NDC and about 80 to 95 mol % terephthalic acid and/or other diacids.

In a preferred embodiment of the invention, the preform is comprised of a PEN copolymer containing about 15 mol % to 25 mol % NDC and about 75 to 85 mol % terephthalic acid and/or other diacids.

PET polymers are generally prepared from terephthalic acid or its ester forming derivatives and ethylene glycol or its ester forming derivatives. In general, at least about 97% by weight of the polymer can comprise repeating ethylene terephthalate groups of the formula:

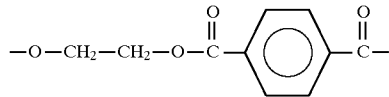

The remainder of the polymer can comprise various ester forming compounds.

The present invention contemplates the use of copolymers of the polyethylene terephthalate in which a minor proportion, for example, up to about 25% by weight, of the ethylene terephthalate units are replaced by compatible monomer units in which the dicarboxylic acid moiety of the monomer is replaced by 2,6-naphthalenedicarboxylate, aromatic dicarboxylic acids such as isophthalic acid, phthalic acid, naphthalenedicarboxylic acid, diphenyldicarboxylic acid, diphenoxyethanedicarboxylic acids, bibenzoic acid, and aliphatic or alicyclic dicarboxylic acids such as adipic acid, sebacic acid, azelaic acid, decanedicarboxylic acid and cyclohexanedicarboxylic acid. The glycol moiety of the monomer may be replaced by aliphatic or alicyclic glycols such as cyclohexanedimethanol, trimethylene glycol, polytetramethylene glycol, hexamethylene glycol, dodecamethylene glycol, diethylene glycol, polyethylene glycol, polypropylene glycol, propane-1,3-diol, butane-1,4-diol, and neopentyl glycol, bisphenols and other aromatic diols such as hydroquinone and 2,2-bis(4'-B-hydroxethoxyphenyl)propane. In addition, various multifunctional compounds such as trimethylolpropane, pentaerythritol, trimellitic acid and trimesic acid can be copolymerized with the polyethylene terephthalate polymer in amounts of up to about 2 percent by weight.

The polyethylene terephthalate polymers useful in the present invention can also contain other compatible additives and ingredients which do not adversely affect performance characteristics of the container such as adversely affecting the taste or other properties of products packaged therein. Examples of such ingredients include thermal stabilizers, light stabilizers, dyes, pigments, plasticizers, fillers, antioxidants, lubricants, extrusion aids, residual monomer scavengers and the like.

The plastic resins useful for making the container of this invention include homopolymers of PEN and PET, and copolymers of PEN and PET. The intrinsic viscosity of PEN is about 0.6 I.V. to about 0.9 I.V., preferably about 0.7 IV. PET having an intrinsic viscosity of from about 0.55 to about 1.04 and preferably from about 0.55 to 0.9 can be employed as the starting material used in producing the preforms of the invention. When the intrinsic viscosity is less than 0.6 I.V., the mechanical strength of the resulting container is not sufficient.

PEN and PET homopolymer resins and PEN and PET copolymer resins useful in this invention are commercially available from Teijin in Japan, Eastman Chemicals in Tennessee, Shell in Akron Ohio, ICI, and Hoechst Celanese.

The invention preferably relates to preforms for making containers for packaging applications in the carbonated and non-carbonated soft drink industry. The manufacturing method to form these preforms includes injection molding, and for the containers includes, but is not limited to single stage, two stage, and double blow molding manufacturing systems. The invention results in a lighter weight bottle as compared to existing PET bottles, having a highly oriented base.

Methods for forming containers of the invention include injection-blow molding. In injection-blow molding the preform is formed from an injection molded blowable geometric form. The preform or blowable form is then contained within a mold cavity having the volumetric configuration of the desired container and the preform is expanded by blowing it with compressed air within the confines of the mold cavity.

Commercially available equipment, as is used in the manufacture of thin walled single use PET beverage containers, may be used to make the containers of the present invention. In addition, commercial equipment like that used in manufacturing conventional thick wall refillable PET containers may also be used.

The container of the invention is rigid and resilient, rather than squeezable. That is, squeezability is undesirable since the inventive container is for pourable applications. Thus, the container formed from the preform of the invention has an average wall thickness of at least 0.25 mm, and more preferably an average wall thickness in the range of 0.25 to 0.8 mm (preferably 0.35 mm).

A preferred preform, which is then blow molded into a biaxially-oriented container, with an overall stretch ratio from 18:1 to 25:1 for containers in the range of 250 ml to 850 ml (or a stretch ratio of 18:1 to 20:1 for containers in the range of 250 ml to 1000 ml) comprises a first component which is a PEN copolymer, and a second component which is commercially available PET homopolymer or copolymer, such as Shell Polyester 8006 and 8406. These components are physically mixed into a blend which has about 5 w % to 70 wt % PEN therein, preferably 5 to 35 wt % to PEN therein. The blend is injection molded such that the preform has a thickness in the range of 3 to 8.0 mm (with a preferred upper limit of 6 mm) at the center side wall forming portion and a thickness in the range of 3 to 8.0 mm (with a preferred upper limit of 6 mm) in the base forming portion, the length of the preform being in the range of 40 to 110 mm. The injection molded preform, when blow-molded, has a stretch ratio in the range of about 18:1 to about 25:1 in order to obtain containers (i.e. bottles) in the range of 250 ml to 850 ml, or a stretch ratio is in the range of 18:1 to 20:1 in order to obtain containers (i.e. bottles) in the range of 250 ml to 1000 ml.

A typical container of the invention is 850 liters, substantially cylindrical in shape, about 220 mm in height without the cap and about 77 mm in outer diameter. The sides of the container are biaxially oriented and radially expanded in a blow mold, and has a side-wall thickness of about 0.25 to 0.65 mm.

FIG. 13 represents a typical preform of the invention. The length of the preform along 1—1 is in the range of 40 to 100 mm. The center side wall thickness along 2—2 is in the range of 3 mm to 8.0 mm. The base forming region thickness also along 1—1 is in the range of 3 to 8.0 mm. The length, center side wall and base thickness may vary so long as the stretch ratio is as defined above. The wall thickness along 3—3 is in the range of 3–8.0 mm. The wall thickness along 4—4 is in the range of 3–8.0 mm. The wall thickness along 5—5 is in the range of 1.7–6.5 mm, preferably 1.7–3.5 mm.

The container of the invention may be blow-molded from a cylindrical injection-molded preform having an open top end and neck finish (See FIGS. 1 and 2). The preform may have a tapered shoulder-forming portion, substantially uniform thickness along the sides of the cylinder, and a base-forming portion preferably in a champagne design, but including a hemispherical base with a base cup or a footed design such as a petaloid design. The preform is amorphous and substantially transparent and is injection molded from a physical mixture of said first and second components, PEN copolymers, or may comprise 100% NDC (PEN homopolymer) as the acid component. However, other materials and preform shapes having the necessary plastic composition and preform dimensional requirements can be used, including preforms with thickened base forming portions to provide a thicker container base having improved creep resistance, or preforms with variable wall thickness portions in the side wall if desired.

The preform is subsequently placed in a blow molding apparatus having an upper mold section which engages the neck finish, a middle mold section having an interior cavity forming the shape of the container side wall, and a lower mold section having an upper surface forming the outwardly concave dome portion of the container base. In accordance with a standard reheat stretch blow mold process, the injection-molded preform is first reheated to a temperature suitable for stretching and orientation, placed in the blow mold, and an axial stretch rod is then inserted into the open upper end and moved downwardly to axially stretch the preform. Subsequently or simultaneously an expansion gas is introduced into the interior of the preform to radially expand the shoulder, sidewall and base forming portions outwardly into contact with the interior surfaces of mold sections.

Figure 3:
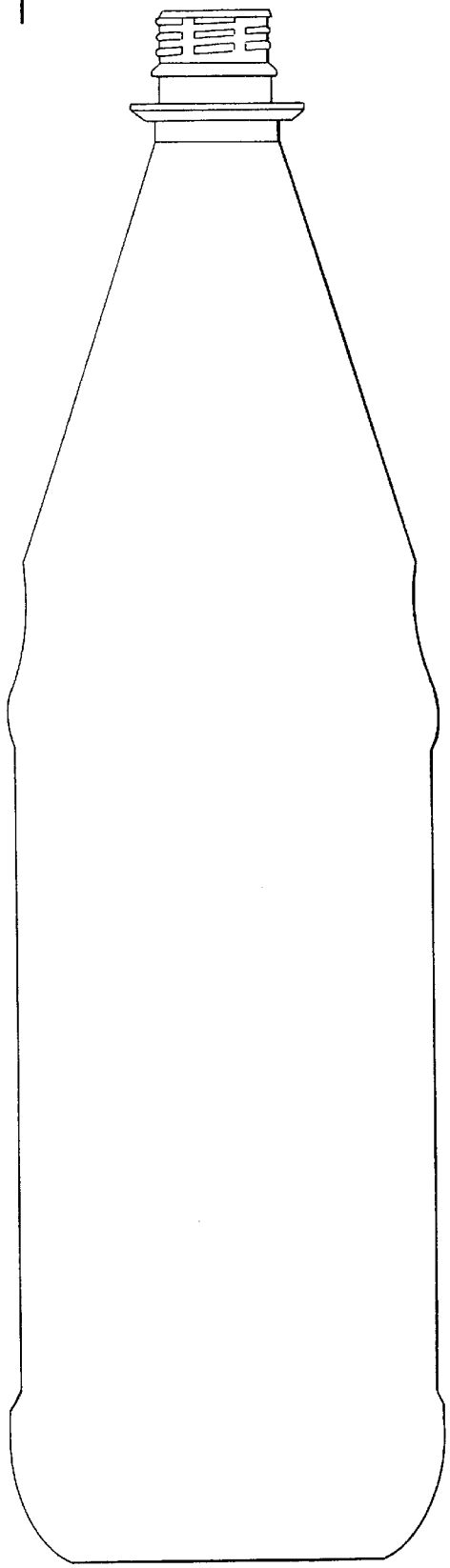
FIGS. 3 and 10 show blow molded containers from an injection molded preform of the invention.

The blown container (FIG. 3) has the same neck finish with outer threads and lowermost neck flange as the preform. The remainder of the bottle has undergone expansion, although to varying degrees. An upper tapered shoulder portion may gradually increase in diameter and orientation while moving downwardly along the bottle. Below the shoulder section may be a radially outwardly projecting upper bumper portion. Below the ornamental panel section where the label may be placed may be a radially outwardly projecting lower bumper, and then a champagne-style base. The base may include an outer base wall gradually reducing in diameter moving downwardly from the upper bumper to a lowermost contact radius on which the bottle rests. Radially inwardly of the contact radius may be a recessed inner base wall or dome having a central gate region. The inner base wall or dome may include a number of symmetrical recessed petaloid portions for increasing the thermal resistance of the base, as is known in the art. In general, the relatively low oriented base has a greater thickness for strength, while the side wall section has a relatively high orientation for strength.

A removable cap is attached to the open upper end of the container. The cap includes a base portion having internal threads which engage the outer threads on the neck finish.

In the container of the invention, there is no need for vacuum panels to be disposed about the vertical centerline of the container. Further, there is no need for post walls in the container of the invention. Moreover, there is no requirement for additional vertically-elongated reinforcing ribs to further stiffen the walls.

The container of the invention may be used for any cosmetic, food, beverage, etc., product which requires a pourable rather than a squeezable container. The product may be pressurized, e.g. carbonated soft drink, or nonpressurized, e.g. juice. In the case of a hot fill product, for instance, juice, vacuum panels could be used. Alternatively, a drop of liquid nitrogen would serve to counter-pressure the container and vacuum panels would not be needed. The container may be used with either hot-fill or cold-fill products wherein the construction provides pourability. For instance, the container formed from the preform of the invention should be able to withstand hot-fill temperatures in the range of 83°–85° C. and higher, without deformation.

The container may be made in a variety of sizes (volume) and shapes (height and diameter). For example, a twelve ounce pourable (i.e. rather than squeezable), container may have a 58.42 mm major diameter and an average wall thickness of at least about 0.635 mm.

In making the preferred container from an amorphous preform according to the reheat stretch blow process, a suitable stretching temperature range is about 70°–130° C. In a preferred embodiment of the invention, the combined axial and circumferential extension is at least 18:1, with an upper limit of 20:1 or 25:1, depending on the desired size of the container.

If desired, a multi-layer preform may be used. However, in the present invention, it should be unnecessary to provide a barrier layer, since the PEN component is present in an amount to provide sufficient barrier properties.

Containers of the invention may contain ornamental panels, but these panels are primarily for design, ornamental use only.

Figure 6:
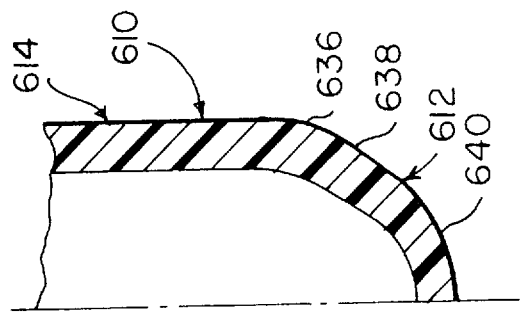
FIG. 6 shows the lower part of the preform shown in FIG. 4.
Figure 5:
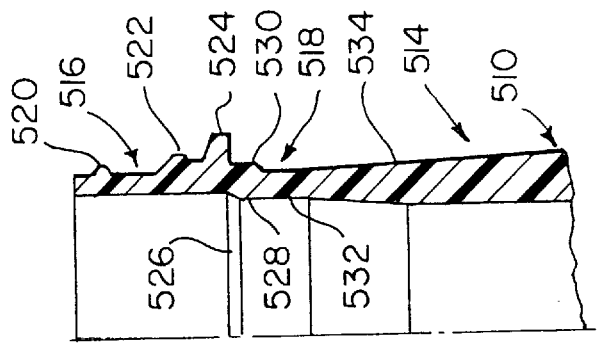
FIG. 5 shows the upper part of the preform shown in FIG. 4.
Figure 4:
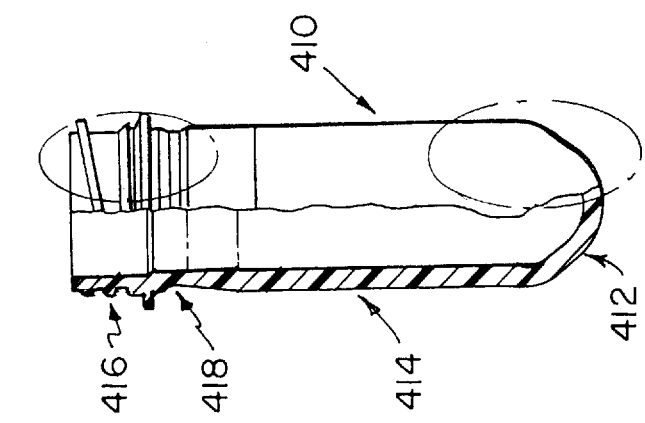
FIG. 4 shows a side view of the preform of the invention.

A preform of the invention is further illustrated in FIGS. 4, 5 and 6. The preform 410 is injection molded from a plastic comprising a physical mixture of (i) a PEN copolymer and (ii) a second component of PET homopolymer or PET copolymer, such that when said first and second components are physically mixed into a blend, said blend has about 5% to 99.9 wt % PEN therein. Alternatively, the preform is injection molded from a PEN copolymer having about 1 to 25 mol % NDC, or from PEN homopolymer. The preform has a thickness in the range of 3 to 8.0 mm at the center side wall forming portion and a thickness in the range of 3 to 8.0 mm in the base forming portion, the length of the preform being in the range of 40 to 100 mm, said injection molded preform preferably having a stretch ratio in the range of about 18:1 to about 25:1. Generally speaking, the various portions of the preform 410 may be identified as including a base portion 412, a body portion 414, a neck finish portion 416 and a neck to body transition 418.

Referring to FIG. 5, it will be seen that the upper part of the preform 510 is illustrated in detail. First of all, the illustrated neck finish portion 516 is in the form of a conventional neck finish which may include external threads 520 for receiving a closure, a locking bead 522 for engagement by a closure tamper indicating ring or band, and a lower flange 524.

Immediately below the flange 524 is the neck to body transition 518. It starts with an internal thickening to define a seat 526 for receiving, for example, a blow nozzle in seated engagement. Immediately below the seat, the transition may include a cylindrical part 528. Below the cylindrical part 528, the transition 518 downwardly tapers in thickness externally as at 530 terminating in a further cylindrical part 532 of minimal cross section. Below the cylindrical part 532, the transition 518 flares both internally and externally as at 534 to join the greater thickness body portion 514.

Referring now to FIG. 6, it will be seen that the base portion 612 begins at the lower end of the body 614 with a radius part 636 which joins a frustoconical part 638 to the body portion 614. The frustoconical part, in turn, carries a part spherical bottom 640 which tapers in thickness from the frustoconical part 638.

It is to be understood that the preform 610 is formed by injection molding and when presented to blow molding apparatus (not shown) is at room temperature. A preform, in a normal blow molding operation, is heated by a series of quartz heaters which results in the heating of the outer surface of the preform to a higher temperature than the inner surface. On the other hand, radio frequency heating has been utilized with the result that the inner surface of the preform is heated to a higher temperature. Hybrid heating utilizing a combination of quartz heaters and radio frequency heaters has been utilized in the past to obtain a uniform temperature throughout the wall of the preform. Such a heating process is disclosed in U.S. Pat. Nos. 4,863,046 and 4,407,651.

Figure 7:
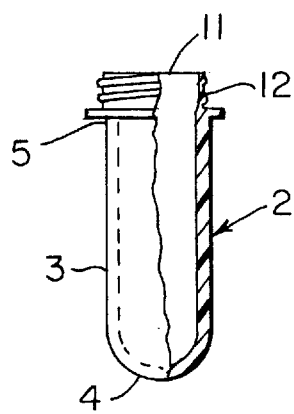
FIGS. 7 and 9 show generic preforms of the invention.
Figure 8:
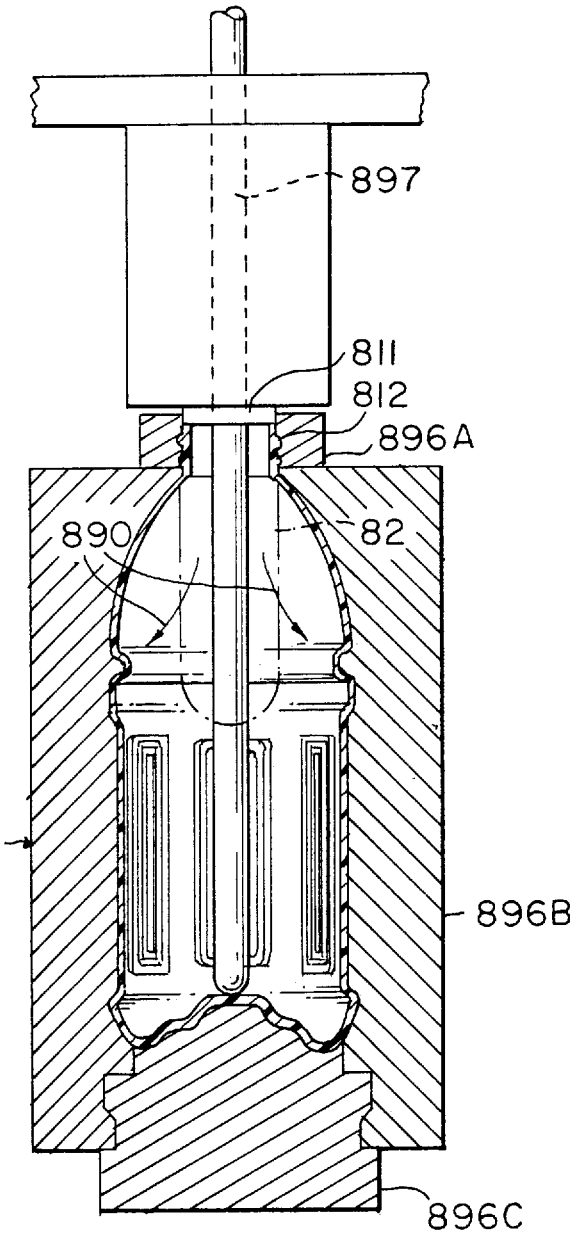
FIG. 8 shows blow-molding of the preform of FIG. 7.

As illustrated in FIGS. 7 and 8, a container of the invention 810 is blow molded from a cylindrical injection molded preform 72 having an open top end 711 and neck finish 712. This preform has a tapered shoulder-forming portion 75, substantially uniform thickness panel forming portion 73, and a base forming portion 74 including a substantially hemispherical bottom end. The preform 72 is amorphous and substantially transparent and may be made of (a) a mixture of PEN copolymer and PET homopolymer or PET copolymer to form a blend in the range of 5–99.9 wt % PEN copolymer, preferably 5–70 wt % PEN copolymer, more preferably 15–35 wt % PEN copolymer, (b) a PEN copolymer containing 5 to 20 mol % NDC and the remainder another diacid (i.e. terephthalic acid), or (c) PEN homopolymer.

As shown in FIG. 8, the preform 82 is placed in a blow molding apparatus 896 having an upper mold section 896A which engages the neck finish 812, a middle mold section 896B having an interior cavity forming the shape of the container side wall, and a lower mold section 896 having an upper surface forming the outwardly concave dome portion of the container base. In accordance with a standard reheat stretch blow mold process, the injection-molded preform 82 is first reheated to a temperature suitable for stretching and orientation, placed in the blow mold, and an axial stretch rod 97 is then inserted into the open upper end 811 and moved downwardly to axially stretch the preform. Subsequently or simultaneously an expansion gas 890 is introduced into the interior of the preform to radially expand the shoulder, sidewall and base forming portions outwardly into contact with the interior surfaces of mold sections 896B and 896C.

The blown container (not shown) obtained from FIG. 8 has the same neck finish with outer threads and lower most neck flange as the preform. The remainder of the bottle has undergone expansion, although to varying degrees.

The present invention has applications beyond the above illustrated preforms and beverage container. More generally, the container may be used for any cosmetic, food, beverage, etc, product. The product may be pressurized, e.g. beer, or nonpressurized, e.g. juice. The container may be used with cold-fill or hot-fill products.

The container may be made in a variety of sizes (volume) and shapes (height and diameter). For example, the blow-molded container produced from the injection molded plastic preform of the present invention may be a container (i.e. bottle) having a volume of about 250 ml, 300 ml, 333 ml, 355 ml, 472 ml, 500 ml, 590 ml, 750 ml, 850 ml or 1000 ml, as well as the corresponding English unit equivalents, and a container (i.e. bottle) having a volume of about 12 ounces, 16 ounces, 20 ounces or 24 ounces. In calculating a stretch ratio of the present invention, the preform internal height and internal diameter is necessary for the calculation. In this regard, the ratio of the preform height (as measured below the finish) to the internal preform diameter is preferably at least 5:1.

In making a container from an amorphous preform according to the reheat stretch blow process, a suitable stretching temperature range is about 70°–170° C. It is advisable to stretch the preform to about 18 to 25 combined axial and circumferential stretch.

It is not necessary to provide a multi-layer preform, e.g. with one or more barrier layers, for a specific product which is degraded by oxygen, moisture, light, etc.

A preform may be reheated on a conventional stretch blow molding machine equipped with a quartz IR reheat oven wherein the preform is heated to a temperature just prior to stretch blowing on the order of 225° F. to 245° F. The blow mold, however, is heated so that the blown container may be maintained at 175° to 325° F. for three to five seconds.

This technology may be utilized in conjunction with a preform configured to yield an initial wall thickness of 0.200 inch and a final bottle wall thickness of 0.025 inch with a total preform draw ratio of 25 to one. This preform may have a weight of 93 grams and a length below the neck finish of 6.250 inches and a mid body diameter of 1.250 inches.

Further, the length of the tapered portion of the preform may be greatly increased which permits orientation of the shoulder area to within 0.1 inch of the finish area for a generic 850 ml bottle configuration.

Drop impact failures in one piece champagne base configuration containers usually occur in the unoriented, amorphous area of the base due to the reduced strength of this area vs. the oriented sidewalls. Crack failures usually initiate in the chime area (radius 32) at the point of impact and propagate through the unoriented wall thickness. To minimize impact failure, the preform may be modified so as to reduce the length of the flute thereby reducing the unoriented wall thickness in the base chime area (radius 32).

Figure 9:
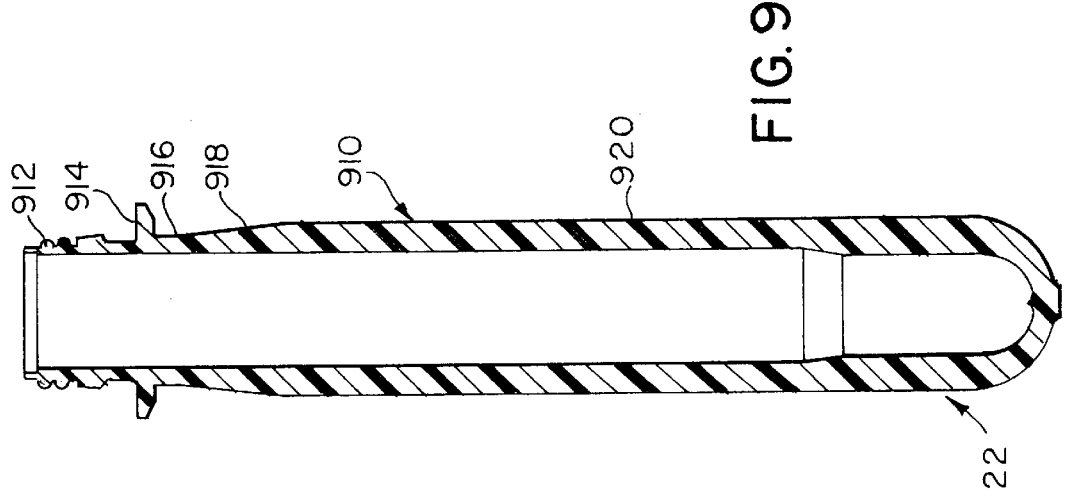

In another embodiment, reference is made to FIG. 9 wherein there is illustrated the vertical cross section of a preform formed in accordance with this invention, the preform being generally identified by the numeral 910. The upper part of the preform 910 includes a threaded neck finish 912 which terminates at its lower end in a capping flange 914. Below the capping flange 914, there is a generally cylindrical section 916 which terminates in a section 918 of gradually increasing external diameter so as to provide for an increasing wall thickness. Below the section 918, there is an elongated body section 920, the extreme lower part of which forms an upper part of a container base forming portion generally identified by the numeral 922.

Figure 10:
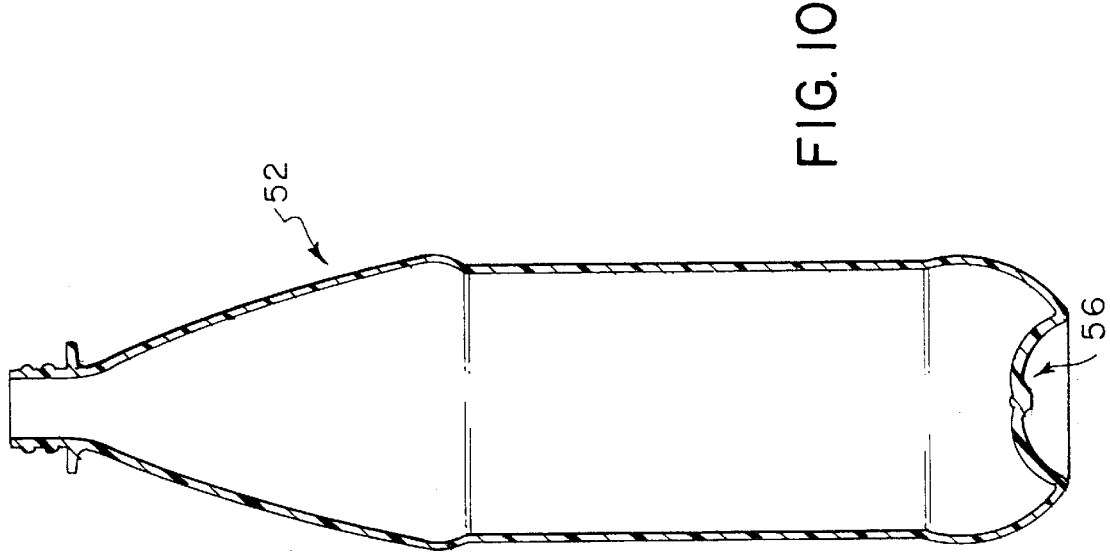

The wall thickness of the various portions of the container 52 above the base construction 56 are clearly shown in FIG. 10. At this time it is pointed out that the container 52 is a 1.5 liter bottle and the preform 910 is configured to form the container 52.

Figure 11:
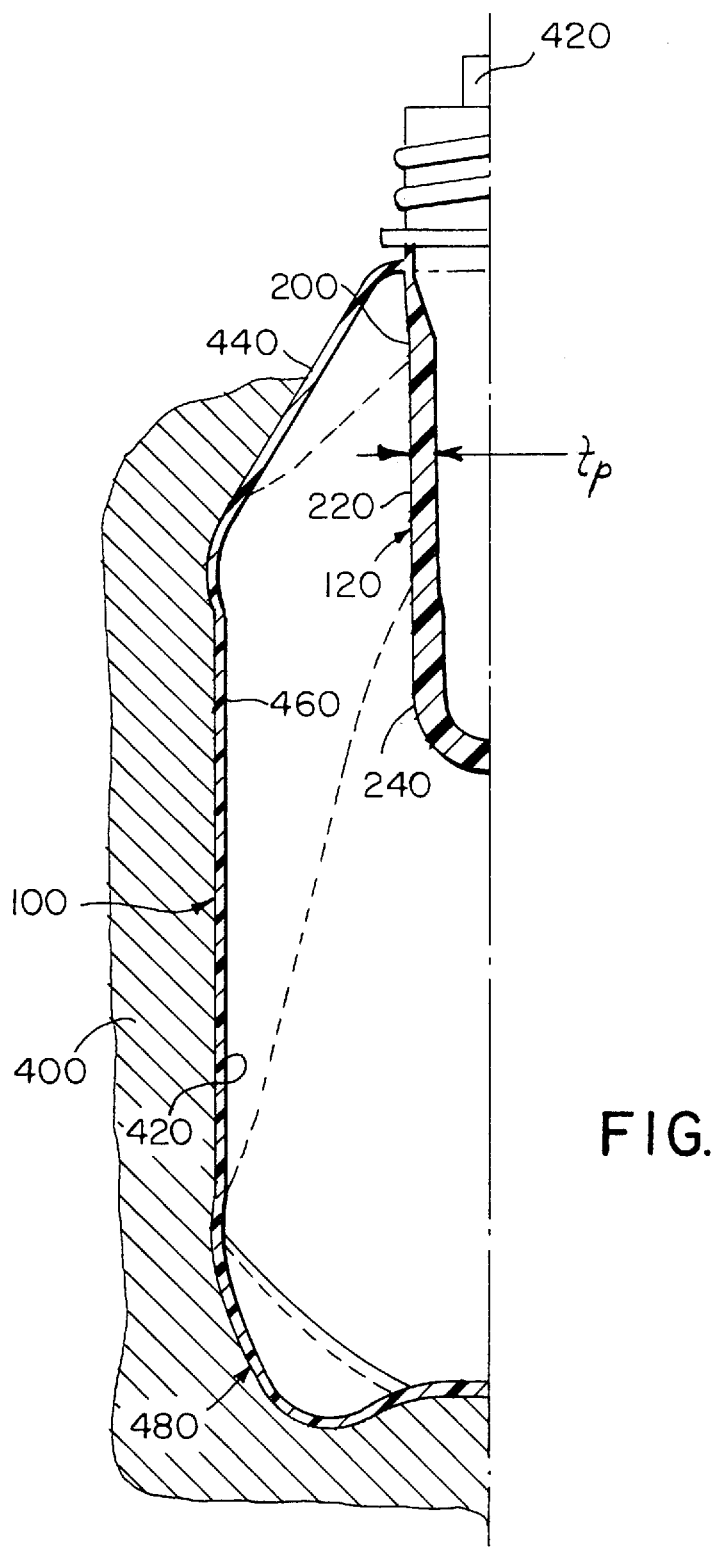
FIG. 11 is a composite schematic vertical sectional view taken through a preform of the invention and shows how the preform is stretch blow molded to match the configuration of an existing mold cavity to form a container of the invention.

In another embodiment of the invention as shown in FIG. 11, the preform 120 is stretch blow molded in a conventional mold 400 of a split construction utilizing a stretch rod 420. The mold 400 has a cavity 420 of a configuration for forming the container 100. The shoulder forming portion 200 is stretched both so as to be axially elongated and of an increased diameter to form a tapered shoulder 440 on the container 100. Next, it will be seen that the preform body portion 220 has a thickness $t_p$ and a length corresponding to an intended length of a container body 460. The specific wall thickness and length ratio between the preform body portion 220 and the container body 460 is one wherein the container body 460 is provided with a stretch ratio (thickness reduction) on the order of 18:1 to 25:1. The thus formed container body 460, being biaxially oriented, has a high resistance to internal pressurization of the container 100 while having very little resistance to radially inwardly collapse when there is a negative pressure or vacuum within the container 100.

Finally, the base forming portion 240 of the preform is stretched to form a base 480 of the container 100 which may include a plurality of legs which are circumferentially spaced and which project from a generally hemispherical portion having a recessed center so that the container seats on feet defined by the legs.

By increasing the wall thickness of the base portion 240 of the preform 120, the base 480 is of a greater thickness. Further, as the base portion 240 of the preform 120 is axially stretched, as well as being stretched in the hoop direction, the greater wall thickness gives a higher section modules which lowers the applied stresses. The combination of thicker walls and increased orientation in the base 480 permits a higher initial internal pressurization of the container.

The invention is further directed to an injection mold defining a cavity corresponding to an injection molded preform of FIGS. 1, 2 or 13.

The invention is also directed to blow-molded containers produced from the injection molded plastic preform described hereinabove.

EXAMPLE

Sample 1

(Control) PET resin

Step A: 21.5 grams of Shell 8006 resin obtained from Shell Polyester Akron, Ohio is injection molded in a mold to produce a preform as shown in FIG. 12. The preform contains PET copolymer with an IV of about 0.80. Injection molding conditions include a temperature range of 280°–290° C. with a cycle time of 35 seconds in a single cavity Arburg 320 Injection Press.

Step B: The resulting preform is blow molded with an LB01 blow molding machine to produce a bottle similar to FIG. 14, resulting in an overall stretch ratio of 9:1. Blow molding conditions include preform reheat time of 60 seconds and a blow pressure of 38 bar. More specifically, a preform reheat time of 15 seconds is for 2 heating locations and 2 equilibration locations for a total reheating time of 60 seconds.

Sample 2

Pre-blended Resin

Step A: 21.5 grams of Shell Polyester VFR40038 blend resin obtained from Shell Polyester, Akron, Ohio is injection molded in a mold which produces a preform as shown in FIG. 1. The preform contains 5–70% PEN, with an IV of about 0.73. The resin is injection molded using a single cavity Arburg 320 Injection Press at 290°–295° C. with a 40 second cycle time.

Step B: The resulting preform is blow molded with an LB01 blow molding machine to produce a bottle as in FIG. 14 having an overall stretch ratio of 21:1 (e.g. 20.79:1). Blow molding preform reheat time is at 28 seconds with a blow pressure of 36 bar.

The dimensions and properties of the 12 ounce contour bottle shown in FIG. 14 and the preform shown in FIG. 1 are as follows:

| | |
|---|---:|
| Bottle height (excluding finish) | 177.2 mm |
| Maximum bottle diameter | 59.5 mm |
| Bottle surface area (excluding finish) | 298.39 cm$^2$ |
| Internal vol. of bottle (excluding finish) | 372 cc |

-continued

| | |
|---|---|
| Internal vol. of preform (excluding finish) | 6.2 cc |
| Height of preform (excluding finish) | 58.369 mm |
| Internal diameter of preform | 8.69 mm |
| Stretch index | 74.8 cm |
| Stretch ratio | 21 |

Figure 14:
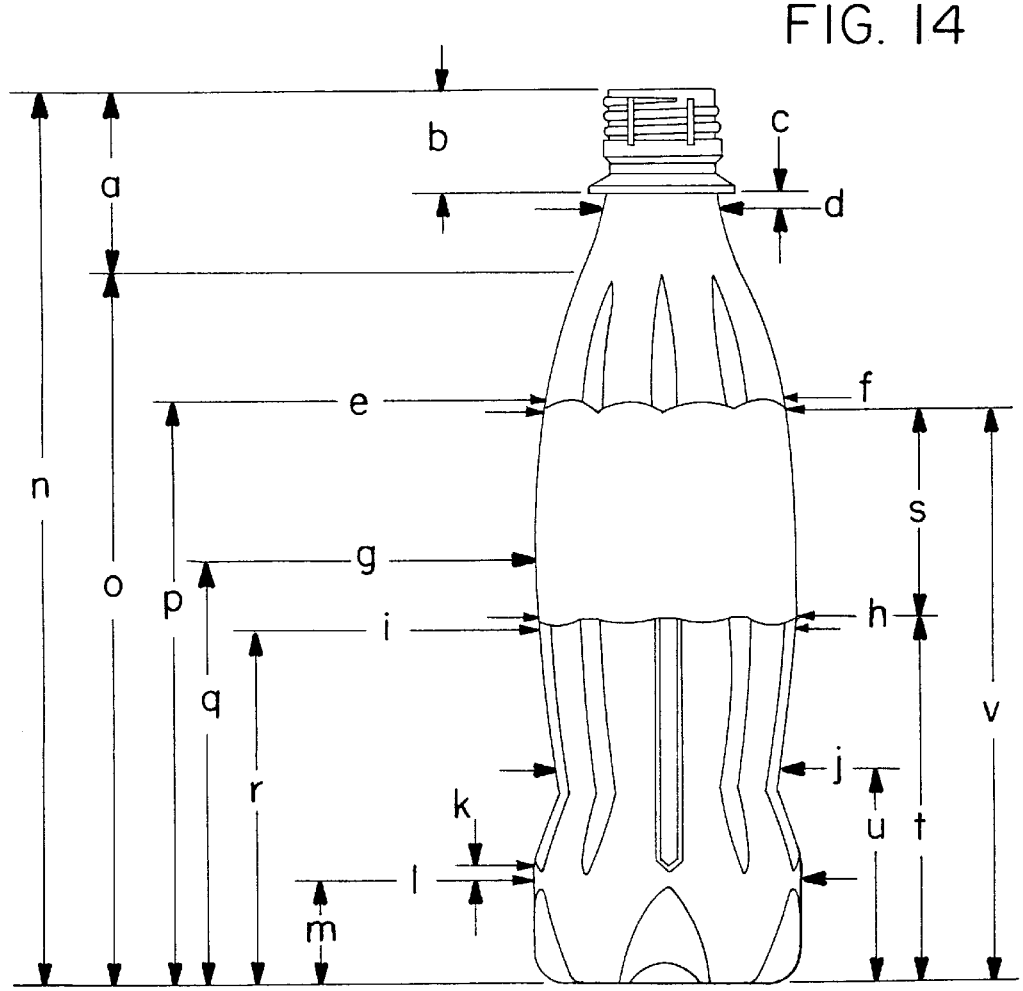
FIG. 14 shows a container of the invention. All values are in millimeters.

The following table shows that dimensions of the 12 ounce contour bottle shown in FIG. 14:

TABLE 7

Dimensions of Contour Bottle - FIG. 14

| Reference Letter in FIG. 14 | Dimensions Millimeters (mm) |
|---|---|
| a | 4,000 ± 0.00 |
| b | 22.80 REF. |
| c | 3.18 STR. |
| d | 26.19 DIA. |
| e | 55.50 DIA. |
| f | 53.50 DIA. |
| g | 58.50 DIA. |
| h | 57.50 DIA. |
| i | 59.50 MAJ. DIA. |
| j | 50.25 DIA. |
| k | 2.00 STR. |
| l | 59.50 MAJ. DIA. |
| m | 21.00 |
| n | 200.00 |
| o | 160.00 |
| p | 130.50 |
| q | 82.75 |
| r | 78.75 |
| s | 47.75 |
| t | 80.75 |
| u | 42.50 |
| v | 128.50 |

The barrier properties of the bottles are measured as described in U.S. Pat. No. 5,473,161, which is herein incorporated by reference in its entirely, to give the following results:

| $CO_2$ (% Loss/Week) | |
|---|---|
| VFR40038 | 2.45 |
| 8006 (Control) | 3.38 |

Sample 3

Pre-blended Resin

Step A: 21.5 grams of Shell Polyester VFR40039 blend resin obtained from Shell Polyester, Akron, Ohio is injection molded in a mold which produces a preform as shown in FIG. 1. The preform contains 5–70 wt % PEN with and IV of about 0.73. The resin is injection molded using a single cavity Arburg 320 Injection Press at 280°–285° C. with a 40 second cycle time.

Step B: The resulting preform is blow molded with an LB01 blow molding machine to produce a bottle as in FIG. 14, having an overall stretch ratio of 21:1. Blow molding preform reheat time is at 25 seconds with a blow pressure of 36 bar.

The barrier properties of the bottles measured as described in said copending application U.S. Ser. No. 08/262,846 are as follows:

| $CO_2$ (% Loss/Week) | |
|---|---|
| VFR40039 | 2.40 |
| 8006 | 3.38 |

Sample 4

PEN Copolymer

Step A: 21.5 grams of Shell Polyester VFR40019 copolymer resin obtained from Shell Polyester, Akron, Ohio, is injection molded in a mold which produces a preform as shown in FIG. 1. The preform contains 1–25 wt % PEN, with an IV of about 0.70. The resin is injection molded using a single cavity Arburg 320 Injection Press at 275°–285° C. with a 37 second cycle time.

Step B: The resulting preform is blow molded with an LB01 blow molding machine to produce a bottle of FIG. 14, resulting in an overall stretch ratio of 21:1. Blow molding preform reheat time is at 22 seconds with a blow pressure of 36 bar.

The barrier properties of the bottles, measured as described in copending application U.S. Ser. No. 08/262,846 are as follows:

| $CO_2$ (% Loss/Week) | |
|---|---|
| VFR40019 | 2.66 |
| 8006 | 3.38 |

All U.S. patents cited above are herein incorporated by reference in their entirety.

The invention being thus described, it will be obvious that the same may be varied in many ways. Such variations are not to be regarded as a departure from the spirit or scope of the invention, and all such modifications as would be obvious to one skilled in the art are intended to be included within the scope of the following claims.

What is claimed is:

1. A container made from an injection molded preform comprising an open ended mouth forming portion, an intermediate body forming portion, and a closed base forming portion, wherein said preform comprises:
   (1) a physical blend of (i) PEN copolymer and (ii) PET homopolymer or PET copolymer, such that when said PET and PEN components are physically mixed into a blend, said blend contains about 5–99.9 wt % PEN copolymer and about 0.1 to 95 wt % PET homopolymer or copolymer therein, or
   (2) a 0.5 to 99.9 mol % 2,6-naphthalene-dicarboxylate containing PEN copolymer, or
   (3) PEN homopolymer, and
   said preform forms a container having a stretch ratio in the range of 18:1 to 25:1 wherein said container has a volume in the range of 250 ml to 850 ml, wherein the stretch index is below 130 cm.

2. The container according to claim 1, wherein said preform has a maximum thickness of 8 mm.

3. The container according to claim 1, wherein said preform comprises an open ended mouth forming portion, an intermediate body forming portion, and a closed base forming portion, wherein said preform further comprises a blend of (i) PEN copolymer and (ii) PET homopolymer or PET copolymer, such that when said PET and PEN components are physically mixed into a blend, said blend has about 5–99.9 wt % PEN copolymer and about 0.1 to 95 wt % PET homopolymer or copolymer therein, said preform forms a container having a stretch ratio in the range of 18:1 to 25:1 wherein said container has a volume in the range of 250 ml to 850 ml, wherein the stretch index is below 130 cm.

4. The container according to claim 1, wherein said preform comprises an open ended mouth forming portion, an intermediate body forming portion, and a closed base forming portion, wherein said preform further comprises a 0.5 to 50 mol % 2,6-naphthalene-dicarboxylate containing PEN copolymer and said preform forms a container having a stretch ratio in the range of 18:1 to 25:1 wherein said container has a volume in the range of 250 ml to 850 ml, wherein the stretch index is below 130 cm.

5. The container according to claim 4, wherein said preform is comprised of a PEN copolymer which is a reaction product of about 0.5 to 99.9 mol % 2,6-naphthalene-dicarboxylate NDC, about 0.1 to 99.5 mol % of another diacid, and a total equimolar portion of a dihydroxy compound.

6. The container according to claim 4, wherein said preform is comprised of a PEN copolymer which is a reaction product of about 5 to 50 mol % 2,6-naphthalene-dicarboxylate, about 50 to 95 mol % of another diacid and a total equimolar portion of dihydroxy compound.

7. The container according to claim 4, wherein said preform is comprised of a PEN copolymer which is a reaction product of about 15 to 50 mol % 2,6-naphthalene-dicarboxylate, about 65 to 95 mol % terephthalic acid, and a total equimolar portion of dihydroxy compound.

8. The container according to claim 4, wherein said preform is comprised of a PEN copolymer which is a reaction product of about 5 to 20 mol % 2,6-naphthalene-dicarboxylate, about 80 to 95 mol % terephthalic acid and a total equimolar portion of ethylene glycol.

9. The container according to claim 1, wherein said preform comprises an open ended mouth forming portion, an intermediate body forming portion, and a closed base forming portion, wherein said preform is further comprised of PEN homopolymer and said preform forms a container having a stretch ratio in the range of 18:1 to 25:1 wherein said container has a volume in the range of 250 ml to 850 ml, wherein the stretch index is below 130 cm.

10. The container according to claim 1, wherein said preform ranges in size from a preform having a thickness of about 3 mm at the center side wall forming portion, a thickness of about 3 mm in the base forming portion, and a length of about 40 mm, to a preform having a thickness of about 8.0 mm at the center side wall forming portion, a thickness of about 8.0 mm in the base forming portion, and a length of about 100 mm.

11. The container according to claim 1, wherein said preform is not of a laminated construction.

12. The container according to claim 1, wherein said preform is injection molded from a physical mixture of (i) 5 to 76 wt % of a first component of a PEN copolymer based on the total weight of the preform, and (ii) 24 to 95 wt % of a second component of PET homopolymer or PET copolymer based on the total weight of the preform.

13. The container according to claim 12, wherein the second component includes up to 25 wt % PET copolymer.

14. The container according to claim 1, wherein said preform is injection molded from a physical mixture of (i) 5–76% of a first component of a PEN copolymer based on the weight of the preform, said PEN copolymer comprising about 5 to 8 mol % terephthalate or other diacid and (ii) 24–95 wt % of a second component of PET homopolymer or PET copolymer, said blend being injection molded such that the preform has a thickness in the range of 3 to 5.7 mm at the center side wall forming portion and a thickness in the range of 3 to 5.3 mm in the base forming portion, the length of the preform being in the range of 73 to 80 mm.

15. The container according to claim 1, wherein said preform is injection molded from a 5 mol % to 25 mol % PEN copolymer based on the total weight of the preform.

16. The container according to claim 1, wherein said preform is injection molded from a 0.5 mol to 50 mol % 2,6-naphthalene-dicarboxylate containing PEN copolymer.

17. A blow-molded container produced from the injection molded preform of claim 1.

18. The container of claim 1, wherein said container is a bottle having a volume of about 250, 300, 333, 355, 472, 500, 590, 750 or 850 ml.

19. The container of claim 1, wherein said container is a bottle having a volume of about 12 ounces, 16 ounces, 20 ounces or 24 ounces.

20. A container made from an injection molded preform comprising an open ended mouth forming portion, an intermediate body forming portion, and a closed base forming portion, wherein said preform comprises:

(1) a physical blend of (i) PEN copolymer and (ii) PET homopolymer or PET copolymer, such that when said PET and PEN components are physically mixed into a blend, said blend contains about 5–99.9 wt % PEN copolymer and about 0.1 to 95 wt % PET homopolymer or copolymer therein, or (2) a 0.5 to 99.9 mol % 2,6-naphthalene-dicarboxylate containing PEN copolymer, or (3) PEN homopolymer, and said preform forms a container having a stretch ratio in the range of 18:1 to 20:1 wherein said container has a volume in the range of 250 ml to 1000 ml, wherein the stretch index is below 130 cm.

21. The container according to claim 20, wherein said preform has a maximum thickness of 8 mm.

22. The container of claim 20, wherein said container is a bottle having a volume of about 250 ml, 300 ml, 333 ml, 355 ml, 472 ml, 500 ml, 590 ml, 750 ml, 850 ml or 1000 ml.

23. A container made from an injection molded preform comprising an open ended mouth forming portion, an intermediate body forming portion, and a closed base forming portion, wherein said preform comprises PEN, and forms a container having a stretch ratio in the range of 18:1 to 25:1 wherein said container has a volume in the range of 250 ml to 850 ml, wherein the stretch index of the container is below 130 cm, and wherein said preform ranges in size from a preform having a thickness of about 3 mm at the center side wall forming portion, a thickness of about 3 mm in the base forming portion, and a length of about 40 mm, to a preform having a thickness of about 8.0 mm at the center side wall forming portion, a thickness of about 8.0 mm in the base forming portion, and a length of about 100 mm.

24. A container made from an injection molded preform comprising an open ended mouth forming portion, an intermediate body forming portion, and a closed base forming portion, wherein said preform forms a container having a stretch ratio in the range of 18:1 to 21:1 wherein said container has a volume in the range of 250 ml to 1000 ml, wherein the stretch index of the container is below 130 cm, and wherein said preform ranges in size from a preform having a thickness of about 3 mm at the center side wall forming portion, a thickness of about 3 mm in the base forming portion, and a length of about 40 mm, to a preform having a thickness of about 8.0 mm at the center side wall forming portion, a thickness of about 8.0 mm in the base forming portion, and a length of about 110 mm.

25. A method for producing a container which comprises:

forming a preform of (1) a physical blend of (i) PEN copolymer and (ii) PET homopolymer or PET copolymer, such that when said PET and PEN components are physically mixed into a blend, said blend contains about 5–99.9 wt % PEN copolymer and about 0.1 to 95 wt % PET homopolymer or copolymer therein, (2) a 0.5 to 99.9 mol % 2,6-naphthalene-dicarboxylate containing PEN copolymer, or (3) PEN homopolymer, and blow molding the preform to form a container so that the stretch ratio of the container is in the range of 18:1 to 25:1 and the volume of the container is in the range of 250 ml to 850 ml, wherein the stretch index of the container is below 130 cm.

26. A method for producing a container which comprises:

forming a preform of (1) a physical blend of (i) PEN copolymer and (ii) PET homopolymer or PET copolymer, such that when said PET and PEN components are physically mixed into a blend, said blend contains about 5–99.9 wt % PEN copolymer and about 0.1 to 95 wt % PET homopolymer or copolymer therein, (2) a 0.5 to 99.9 mol % 2,6-naphthalene-dicarboxylate containing PEN copolymer, or (3) PEN homopolymer, and blow molding the preform to form a container so that the stretch ratio of the container is in the range of 18:1 to 20:1 and the volume of the container is in the range of 250 ml to 1000 ml, wherein the stretch index of the container is below 130 cm.

27. A bottle made from an injection molded preform comprising an open ended mouth forming portion, an intermediate body forming portion, and a closed base forming portion, wherein said preform comprises:

(1) a physical blend of (i) PEN copolymer and (ii) PET homopolymer or PET copolymer, such that when said PET and PEN components are physically mixed into a blend, said blend contains about 5–99.9 wt % PEN copolymer and about 0.1 to 95 wt % PET homopolymer or copolymer therein, or (2) a 0.5 to 99.9 mol % 2,6-naphthalene-dicarboxylate containing PEN copolymer, or (3) PEN homopolymer, and said bottle having a stretch ratio in the range of 18:1 to 25:1 and a volume in the range of 250 ml to 850 ml, wherein the stretch index is below 130 cm.

28. A bottle made from an injection molded preform comprising an open ended mouth forming portion, an intermediate body forming portion, and a closed base forming portion, wherein said preform comprises:

(1) a physical blend of (i) PEN copolymer and (ii) PET homopolymer or PET copolymer, such that when said PET and PEN components are physically mixed into a blend, said blend contains about 5–99.9 wt % PEN copolymer and about 0.1 to 95 wt % PET homopolymer or copolymer therein, or (2) a 0.5 to 99.9 mol % 2,6-naphthalene-dicarboxylate containing PEN copolymer, or (3) PEN homopolymer, and said bottle having a stretch ratio in the range of 18:1 to 20:1 and a volume in the range of 250 ml to 1000 ml, wherein the stretch index is below 130 cm.

29. A bottle made from an injection molded preform comprising an open ended mouth forming portion, an intermediate body forming portion, and a closed base forming portion, said preform comprising PEN, said bottle having a stretch ratio in the range of 18:1 to 25:1 and a volume in the range of 250 ml to 850 ml, wherein the stretch index of the bottle is below 130 cm, and wherein said preform ranges in size from a preform having a thickness of about 3 mm at the center side wall forming portion, a thickness of about 3 mm in the base forming portion, and a length of about 40 mm, to a preform having a thickness of about 8.0 mm at the center side wall forming portion, a thickness of about 8.0 mm in the base forming portion, and a length of about 100 mm.

30. A bottle made from an injection molded preform comprising an open ended mouth forming portion, an intermediate body forming portion, and a closed base forming portion, said bottle having a stretch ratio in the range of 18:1 to 21:1 and a volume in the range of 250 ml to 1000 ml, wherein the stretch index of the bottle is below 130 cm, and wherein said preform ranges in size from a preform having a thickness of about 3 mm at the center side wall forming portion, a thickness of about 3 mm in the base forming portion, and a length of about 40 mm, to a preform having a thickness of about 8.0 mm at the center side wall forming portion, a thickness of about 8.0 mm in the base forming portion, and a length of about 110 mm.

31. A container made from an injection molded preform comprising an open ended mouth forming portion, an intermediate body forming portion, and a closed base forming portion, wherein said preform comprises PEN homopolymer, said preform forms a container having a stretch ratio in the range of 18:1 to 25:1 wherein said container has a volume in the range of 250 ml to 850 ml and an average container sidewall thickness of at least 0.35 mm, wherein the stretch index of the container is below 130 cm.

32. A container made from an injection molded preform comprising an open ended mouth forming portion, an intermediate body forming portion, and a closed base forming portion, wherein said preform comprises PEN homopolymer, and said preform forms a container having a stretch ratio in the range of 18:1 to 20:1, wherein said container has a volume in the range of 250 ml to 1000 ml and an average container sidewall thickness of at least 0.35 mm, wherein the stretch index of the container is below 130 cm.

* * * * *